United States Patent [19]

Maertens

[11] 4,206,946
[45] Jun. 10, 1980

[54] VEHICLE CONVERTIBLE SEAT AND LOCKING ARRANGEMENT

[75] Inventor: Donald E. Maertens, Washington, Mich.

[73] Assignee: General Motors Corporation, Detroit, Mich.

[21] Appl. No.: 21,559

[22] Filed: Mar. 19, 1979

[51] Int. Cl.² .................. A47C 1/00; B60N 1/10
[52] U.S. Cl. .................. 297/379; 292/217; 296/66
[58] Field of Search .......... 297/379, 378, 366–369, 297/354, 355; 296/66, 69, 65 R; 292/214, 217, 222

[56] References Cited

U.S. PATENT DOCUMENTS

| 3,013,838 | 12/1961 | Semar et al. | 296/66 |
| 3,161,076 | 12/1964 | Ferrara | 297/64 X |
| 3,338,633 | 8/1967 | Jackson | 297/367 X |
| 3,522,970 | 8/1970 | Francis | 296/65 R X |
| 3,727,976 | 4/1973 | Lystad | 297/379 X |

Primary Examiner—William E. Lyddane
Attorney, Agent, or Firm—R. L. Phillips

[57] ABSTRACT

A vehicle convertible seat and locking arrangement, wherein a spring biased catch member pivotally mounted on the seat back is engageable with separate stationary latches and is guided for engagement therewith by a guide surface between the latches and wherein the spring force on the catch member urges its guided movement and establishes and maintains engagement of the catch member with one of the latches to lock the seat in its upright position and wherein the spring force also establishes engagement of the catch member with the other latch but the compression of the cushions thereafter maintains this engagement to lock the seat back in its horizontal position.

3 Claims, 6 Drawing Figures

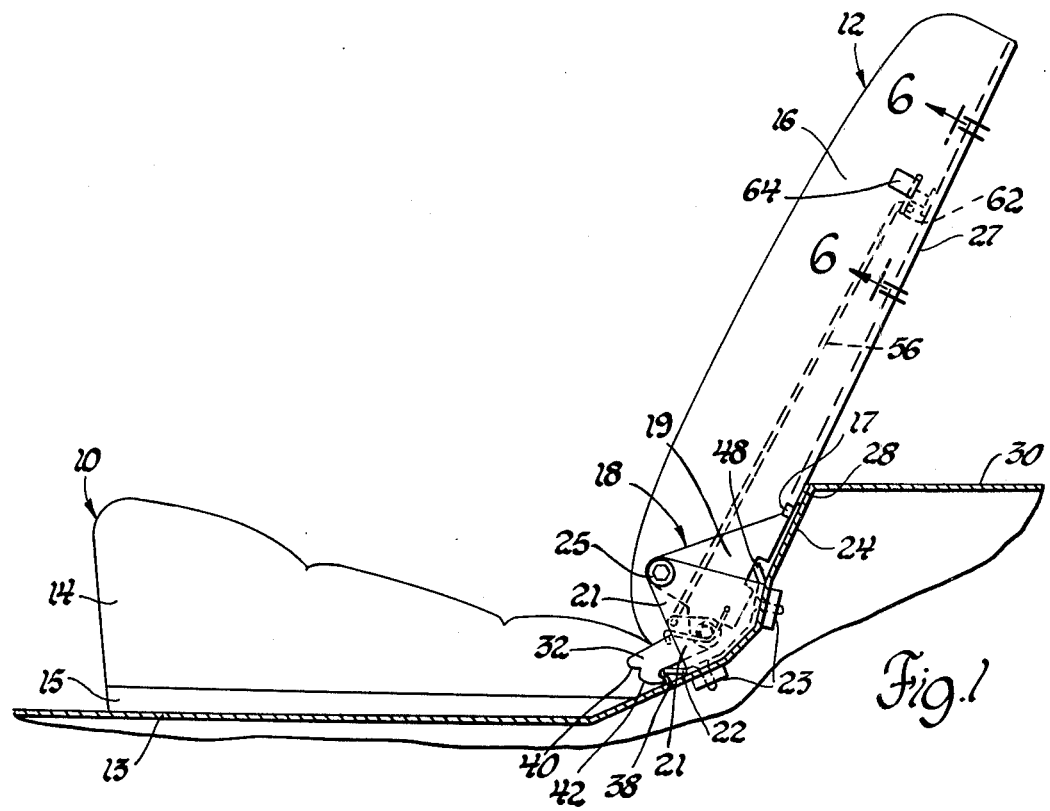
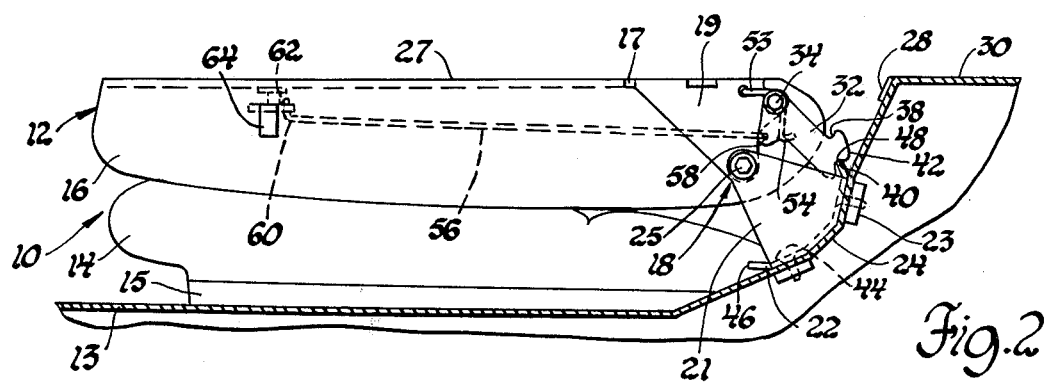
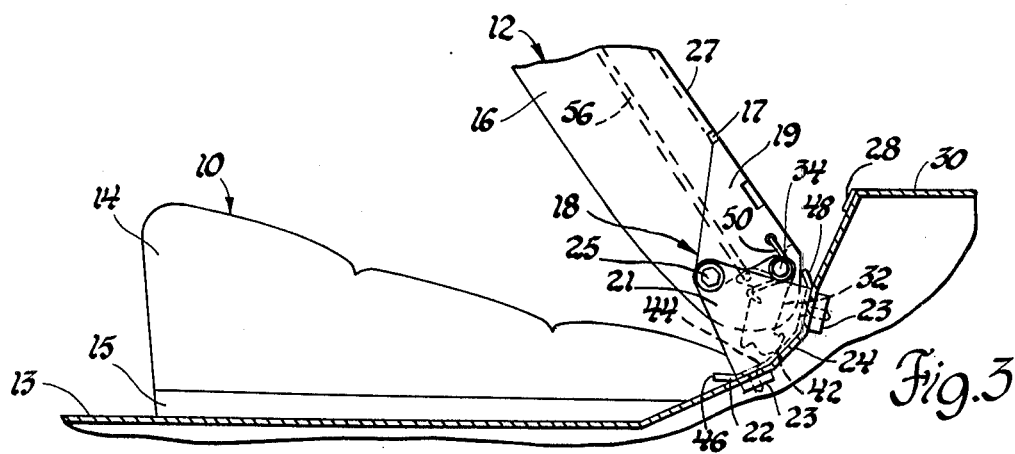

VEHICLE CONVERTIBLE SEAT AND LOCKING ARRANGEMENT

This invention relates to a vehicle convertible seat and locking arrangement and more particularly to a single locking device that locks the seat back in both an upright position and a horizontal position.

In a vehicle having a convertible seat whose back is to be locked in both an upright position for passenger use and a horizontal position for storage use, it is desirable that the locking mechanism be simple yet be capable of establishing both locked conditions. In addition, it is desirable that where the locking conditions are spring forced, these forces be at a minimum so as to reduce wear in the mechanism as well as operator effort in the operation thereof.

According to the present invention, these and other objectives are met with an improved locking arrangement having a single catch member which is mounted on the seat back and a pair of latch members with a guide therebetween which are fixed together with the guide in the vehicle. The latch members are separately engageable by hook and notch portions on the catch member to prevent the seat back from swinging toward and away from the seat bottom from the upright and horizontal seat back positions, respectively, and the guide is engaged by a curved end of the catch member between the hook and notch portions to guide the latter to their respective locking engagements as the seat back is moved between its positions. A single spring is provided for holding the catch member in this guided relation and also establishing the catch member engagement with the respective latch members as the seat back is moved into its positions. A simple manually operated linkage operates to release the catch member from engagement with either of the latch members. Thus, the seat back is releasably lockable against forward movement from its upright position by cooperation of the catch member's hook portion, the upright position latch member and the spring with release effected by operation of only the release linkage. On the other hand, the compression of the seat cushions acts on the catch member to hold its notch portion in engagement with the horizontal position latch member to maintain the seat back in its horizontal position with release thereof then effected by slight swinging movement of the seat back toward the seat bottom with accompanying slight further compression of the seat cushions which then permits release of the horizontal position locking engagement by operation of the release linkage. Thus, the seat back locking is accomplished with only one locking mechanism having a simple catch, latch, and catch guide arrangement and a single spring which biases the catch and need only provide a low force because of the hooked engagement which locks the upright seat back position and the loading on the latch member provided by the compression of the cushions which holds the notch engagement to lock the seat back in its horizontal position.

These and other objects of the present invention will be more apparent from the following description and drawings in which:

FIG. 1 is a side view partially in section of a portion of a vehicle body showing a convertible seat and locking arrangement.

FIG. 2 is a view similar to FIG. 1 but showing the seat back in its horizontal position.

FIG. 3 is a view similar to FIG. 1 but showing the seat back in an intermediate position.

Figure 4:
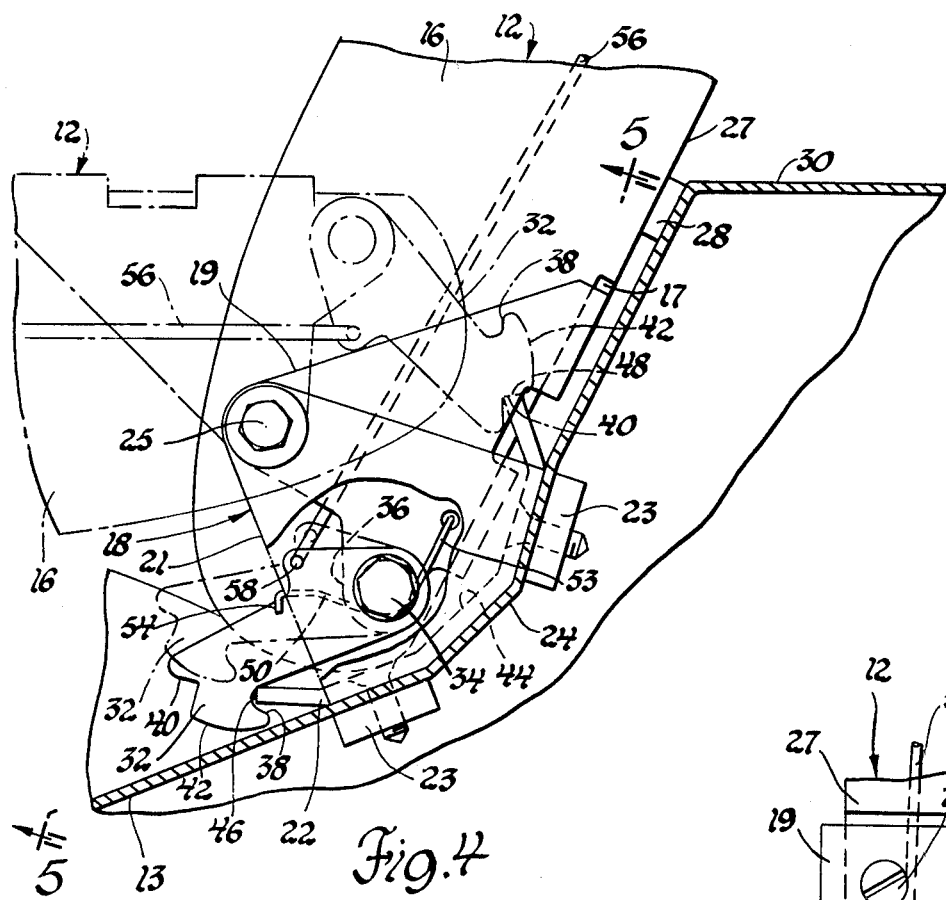
FIG. 4 is an enlarged view of a portion of FIG. 1.

Referring to the drawings, there is shown a seat bottom 10 and a seat back 12 which are mounted on a vehicle floor 13 and wherein the seat back is pivotable relative thereto between an upright position as shown in FIG. 1 for passenger use and a horizontal position as shown in FIG. 2 wherein goods may then be stored on the back thereof. The seat bottom 10 comprises a cushion 14 that is mounted on a frame 15 which is fixed to the vehicle floor 13 and the seat back 12 also comprises a cushion 16 that is mounted on a frame 17 but which is hinged at the bottom thereof and at the back edge of the seat bottom to the vehicle floor.

Figure 5:
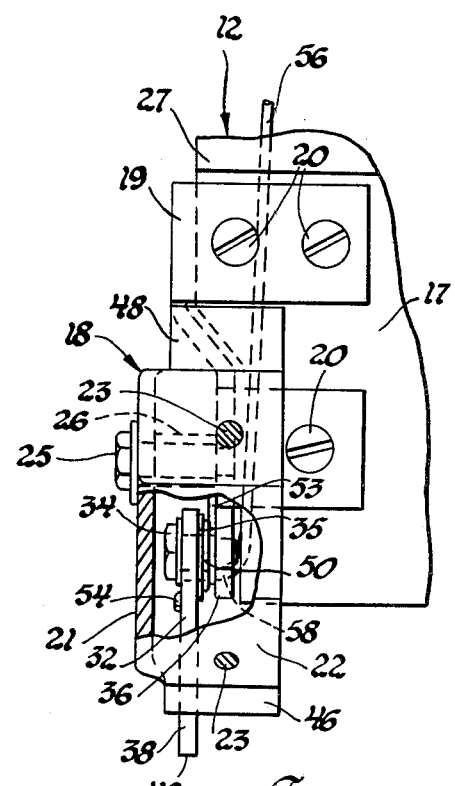
FIG. 5 is a view taken along the line 5—5 in FIG. 4.

The seat back frame 17 is hinged to the floor at opposite sides of the seat back cushion 16 adjacent its lower end by a pair of aligned hinges 18 of which only the outer one is shown. Each of the hinges comprises a strap 19 which extends alongside the seat back cushion 16 and has a pair of flanges which are fixed to the backside of the back frame 17 at a lower corner thereof by bolts 20 as shown in FIG. 5. A stationary hinge strap 21 is arranged outward of and extends alongside the seat back hinge strap 19 and has a flange 22 which extends inward under the seat back hinge strap and is secured by threaded fasteners 23 to an inclined section 24 of the vehicle floor. A pivot bolt 25 passes through a hole in the stationary hinge strap 21 and a cylindrical spacer 26 between the hinge straps and is threaded to the seat back hinge strap 19 to pivotally connect the hinge straps in spaced relationship as shown in FIG. 5 and thereby hinge the seat back to the vehicle floor. The hinge axes are elevated above the rear portion of the seat bottom 10 and nearer the front than the back of the seat back 12 so that the bottom of the seat back is swingable above the seat bottom to the upright position shown in FIG. 1 which is determined by the back side 27 of its frame engaging a stop pad 28 mounted on the inclined vehicle floor section 24 adjacent its upper edge. Alternatively, the seat back 12 is swingable to the horizontal position shown in FIG. 2 where its backside 27 is horizontal with an elevated rearward portion 30 of the vehicle floor and with the establishment of such horizontal position requiring substantial compression of the seat cushions 14 and 16 for locking the seat back in this position as will be described in more detail later.

The seat back 12 is locked in both its vertical and horizontal positions by a single locking mechanism associated with one of the two hinges and preferably the outer hinge which is closest a side or door of the vehicle. The locking mechanism comprises a flat elongated catch member 32 which is pivotally connected at one end by a pivot bolt 34 that extends through a hole in the catch member and through a cylindrical spacer 35 and is threaded to an arm 36 that is formed integral with the seat back hinge strap 19 and extends downward therefrom in the same plane and from the bottom edge thereof as viewed in FIGS. 4 and 5. The other end of catch member 32 is free to swing and has formed thereon both a hook portion 38 and a 90° V-notch portion 40 with a curved convex surface 42 extending therebetween. The flange 22 of stationary hinge strap 21 provides a curved concave guide surface 44 which is opposite and engageable with the curved convex end 42 of the catch member 32 as shown in FIG. 3 and in addition, is formed with integral projecting inclined latch tabs or members 46 and 48 at opposite ends of the guide surface 44 which are engageable by the respective hook and notch portions 38 and 40 of the catch member 32 as shown in FIGS. 1, 2 and 4. As shown in FIGS. 1 and 4, the catch member's hook portion 38 hooks over the edge of the upright position latch tab 46 to lock and readily release on command the upright seat back position, but the catch member's notch portion 40 as shown in FIG. 2 and in phantom line in FIG. 4 only abuts with the edge of the horizontal position latch tab 48 to lock the horizontal seat back position and permit its subsequent release with the use of seat cushion compression as will be described in more detail later.

The catch member 32 is biased counterclockwise as viewed in FIGS. 1-4 by a wire spring 50 to hold the catch member's curved end 42 in engagement with and thereby be guided by the stationary guide surface 44. This causes the catch member 32 to swing in unison with the seat back 12 as the latter is moved between its upright and horizontal positions and then when the seat back is moved into these positions the spring 50 causes the catch member to pivot or swing counterclockwise with respect to the seat back to force the catch member's upright and horizontal catching portions 38 and 40 into engagement with the respective latch tabs 46 and 48. The spring 50, as shown in FIGS. 1-5, includes a coil which is received about the spacer 35 between the catch member 32 and the arm 36 of the seat back hinge strap 19 and has a right-angle bend 53 at one end which engages a hole in this hinge strap while the opposite end is provided with a hook 54 which hooks over one edge of the catch member 32.

Figure 6:
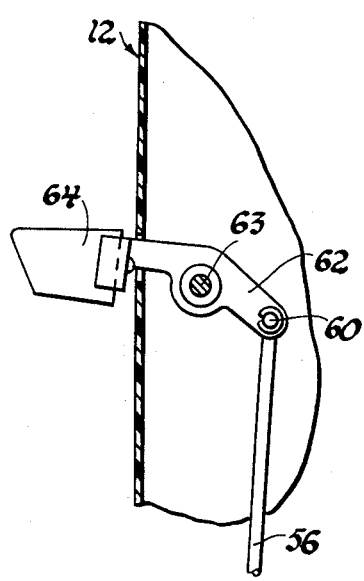
FIG. 6 is an enlarged view taken along the line 6—6 in FIG. 1.

Catch member 32 is manually operated at a convenient position on the seat back to be released from both of its locked conditions by a pull rod 56 which is mounted within the seat back 12. The rod 56 has a right-angle bent portion 58 at one end which is retained in a hole in the catch member at a substantial distance from its pivot axis and in an angular location relative to its catching portions 38 and 40 so that a pulling force applied to the rod urges the catch member to pivot counterclockwise against the force of spring 50. As shown in FIG. 6, the other end 60 of the rod is provided with a right-angle bend which is retained in a hole in one end of a lever 62 that is pivotally mounted at a point intermediate its length to the seat back frame 17 near the upper end thereof by a pivot bolt 63. The other end of lever 62 projects out through the side of the seat back 12 and has a handle 64 which may be pushed downward by an operator as viewed in FIG. 6 to thus effect the required pulling movement on the rod to release the locks.

When the seat back 12 is in the upright position with the handle 64 released as shown in FIGS. 1 and 4, it is thus held against backward swinging movement by its backside 27 engaging with the stop 28 and is prevented from swinging forward by the catch member's hook portion 38 engaging the stationary latch tab 46 with such locked engagement held by the spring 50 and also the force of gravity acting on the catch member 32 which is at an angle of about 60° from vertical in this position. Then to move the seat back 12 to the horizontal position, the operator merely pushes down on the release handle 64 which pulls on the rod 56 to pivot the catch member 32 clockwise against the force of spring 50 and gravity and bring its catch portion 38 out of its locked engagement with the stationary latch tab 46 as shown in phantom line in FIG. 4. Then the operator may release the handle and swing the seat back toward the seat bottom 10. As the seat back is thus swung, the spring 50 maintains the curved end 42 of the catch member 32 in guided engagement with the stationary guide surface 44 as shown in FIG. 3 until the notch portion 40 clears the stationary latch tab 48 at which time the seat back will be in the horizontal position and the seat bottom and seat back cushions 14 and 16 will have engaged and been compressed a predetermined amount as shown in FIG. 2 and in phantom line in FIG. 4. The spring 50 is then permitted to pivot the catch member 32 slightly counterclockwise bringing its curved end 42 out of engagement with the stationary guide surface 44 and bringing its notch portion 40 into engagement with the stationary latch tab 48. Thereafter, the cushion compression then holds the notch portion 40 in engagement with the stationary latch tab 48 to prevent the seat back from swinging upward from its horizontal position. In this catch member position, the reaction force at the stationary latch tab 48 on the notch portion 40 of the catch member 32 is directed toward the catch member's pivot axis so that there is produced no movement or swinging force on this member so that this locked condition is maintained. In addition, the catch member 32 is at an angle of about 45° from vertical in this position so that gravity on the catch member also helps to hold this engagement.

Then to return the seat back from its horizontal to upright position, the operator simply pushes downward on the seat back 12 causing slight further compression of the cushions with the resulting slight counterclockwise swinging movement of the seat back also swinging the catch member 32 therewith to a position where its notch portion 40 is clear of the stationary latch tab 48 and free to pivot clockwise. The operator then operates the release handle 64 to swing the catch member 32 slightly clockwise against the force of spring 50 so that its notch portion 40 clears the latch tab 48 in initial upward swinging movement of the seat back caused by the cushions then being permitted to expand. The operator may then release the handle 64 whereupon the spring 50 again establishes engagement of the catch member's curved end 42 with the stationary guide surface 44. Then with continued upward swinging movement of the seat back, the stationary guide surface 44 guides the catch member 32 to swing with the seat back until the upright seat back position is reached at which time the catch member's hook portion 38 will be forced to hook onto the stationary latch tab 46 to lock the seat back in its upright position.

The above described preferred embodiment is illustrative of the invention which may be modified within the scope of the appended claims.

The embodiments of the invention in which an exclusive property or privilege is claimed are defined as follows:

1. A convertible vehicle seat and locking arrangement comprising a seat bottom with a cushion, a seat back with a cushion, hinge means for supporting said seat back to swing between an upright position relative to said seat bottom and a horizontal position wherein the seat cushions contact and are compressed a predetermined amount, catch means on said seat back, stationary upright position latch means and horizontal position latch means separately engageable by said catch means to prevent said seat back from swinging toward and away from said seat bottom from the respective upright and horizontal positions, stationary guide means for guiding said catch means to engage the respective latch means as said seat back is moved between said positions, biasing means for holding said catch means in guided relationship with said guide means and for establishing said catch means in engagement with the respective latch means when said seat back is moved into said positions, and release means for releasing said catch means from engagement with either said latch means whereby the seat back is releasably lockable against movement from its upright position toward the seat bottom by cooperation of the catch means, upright position latch means and biasing means with release thereof effected by operation of only the release means, and whereby the compression of the cushions acts on the catch means to hold its engagement with the horizontal position latch means to maintain the seat back in its horizontal position and locked against movement to said upright position with release thereof effected by slight swinging movement of the seat back toward the seat bottom with accompanying slight further compression of the cushions and then operation of the release means.

2. A convertible vehicle seat and locking arrangement comprising a seat bottom with a cushion, a seat back with a cushion, hinge means for supporting said seat back to swing between an upright position relative to said seat bottom and a horizontal position wherein the seat cushions contact and are compressed a predetermined amount, catch means on said seat back, stationary upright position latch means and horizontal position means separately engageable by said catch means to prevent said seat back from swinging toward and away from said seat bottom from the respective upright and horizontal positions, stationary guide means for guiding said catch means to engage the respective latch means as said seat back is moved between said positions, biasing means for holding said catch means in guided relationship with said guide means and for establishing said catch means in engagement with the respective latch means when said seat back is moved into said positions, said catch means including a hook portion for engaging said upright position latch means and further including a notch portion for engaging said horizontal position latch means, said notch portion and said horizontal position latch means arranged so that the compression of the cushions acts to hold their engagement, and release means for releasing said catch means from engagement with either said latch means whereby the seat back is releasably lockable against movement from its upright position toward the seat bottom by cooperation of the hook portion, upright position latch means and biasing means with release thereof effected by operation of only the release means, and whereby the compression of the cushions acts on the catch means to hold the notch portion in engagement with the horizontal position latch means to maintain the seat back in its horizontal position and locked against movement to said upright position with release thereof effected by slight swinging movement of the seat back toward the seat bottom with accompanying slight further compression of the cushions and then operation of the release means.

3. A convertible vehicle seat and locking arrangement comprising a seat bottom with a cushion, a seat back with a cushion, hinge means for supporting said seat back to swing between an upright position relative to said seat bottom and a horizontal position wherein the seat cushions contact and are compressed a predetermined amount, a catch member pivotally mounted at one end on said seat back and free to swing at the other end thereof, the swinging end of said catch member having a curved surface with a hook portion and a notch portion at the opposite ends thereof, a stationary upright position latch member and a stationary horizontal position latch member separately engageable by the respective hook and notch portions of said catch member to prevent said seat back from swinging toward and away from said seat bottom from the respective upright and horizontal position, stationary guide means engageable by said curved surface of said catch member to guide said hook and notch portions to engage the respective latch members as said seat back is moved between said positions, a spring arranged between said catch member and seat back to bias said catch member to swing in one direction to hold said curved surface of said catch member in guided relationship with said guide means and, alternatively, establish said hook and notch portions in engagement with the respective latch members when said seat back is moved into said positions, and release linkage means for swinging said catch member in a direction opposite said one direction forced by said spring to release said hook and notch portions from engagement with the respective latch members whereby the seat back is releasably lockable against forward movement from its upright position toward the seat bottom by cooperation of the hook portion, upright position latch member and spring with release thereof effected by operation of only the release linkage means, and whereby the compression of the cushions acts on the catch member to hold the notch portion in engagement with the horizontal position latch member to maintain the seat back in its horizontal position and locked against movement to said upright position with release thereof effected by both slight swinging movement of the seat back toward the seat bottom with accompanying slight further compression of the cushions and then operation of the release linkage means.

* * * * *

UNITED STATES PATENT AND TRADEMARK OFFICE
CERTIFICATE OF CORRECTION

PATENT NO. : 4,206,946
DATED : June 10, 1980
INVENTOR(S) : Donald E. Maertens

It is certified that error appears in the above—identified patent and that said Letters Patent is hereby corrected as shown below:

Column 5, line 33, after "position" insert -- latch --.

Signed and Sealed this

Twenty-third Day of December 1980

[SEAL]

Attest:

SIDNEY A. DIAMOND

Attesting Officer

Commissioner of Patents and Trademarks